(12) United States Patent
Huang (10) Patent No.: US 6,457,244 B1
(45) Date of Patent: Oct. 1, 2002

(54) STRUCTURE OF A HACKSAW

(76) Inventor: Yin-Hae Huang, P.O. Box 697, Feng-Yuan City 420 (TW)

( * ) Notice: Subject to any disclaimer, the term of this patent is extended or adjusted under 35 U.S.C. 154(b) by 0 days.

(21) Appl. No.: 09/897,841

(22) Filed: Jun. 28, 2001

(51) Int. Cl.⁷ .............................................. B27B 21/06
(52) U.S. Cl. ........................................ 30/513; 30/517
(58) Field of Search ......................... 30/513, 517, 507, 30/509, 512

(56) References Cited

U.S. PATENT DOCUMENTS 3,822,731 A * 7/1974 Keymer ................... 30/513 X
4,571,829 A * 2/1986 Withers ................... 30/513 X
5,388,333 A * 2/1995 Chen ........................... 30/513

* cited by examiner

Primary Examiner—Douglas D. Watts (57) ABSTRACT

A structure of a hacksaw includes a frame which is combined by a fore part and a rear part, an adjustable mechanism under the fore part connected to one end of the blade for adjusting the tilt angle of the blade, a positioning mechanism under the rear part connected to the other end of the blade and for tensioning the blade by a wedge lever. The frame disassembly to quickly adjust the length to serve different lengths of the blade.

3 Claims, 9 Drawing Sheets

STRUCTURE OF A HACKSAW

BACKGROUND OF THE INVENTION

The present invention relates to hacksaws and more particularly to a structure of a hacksaw in which is quickly assembled or disassembled.

Figure 1:
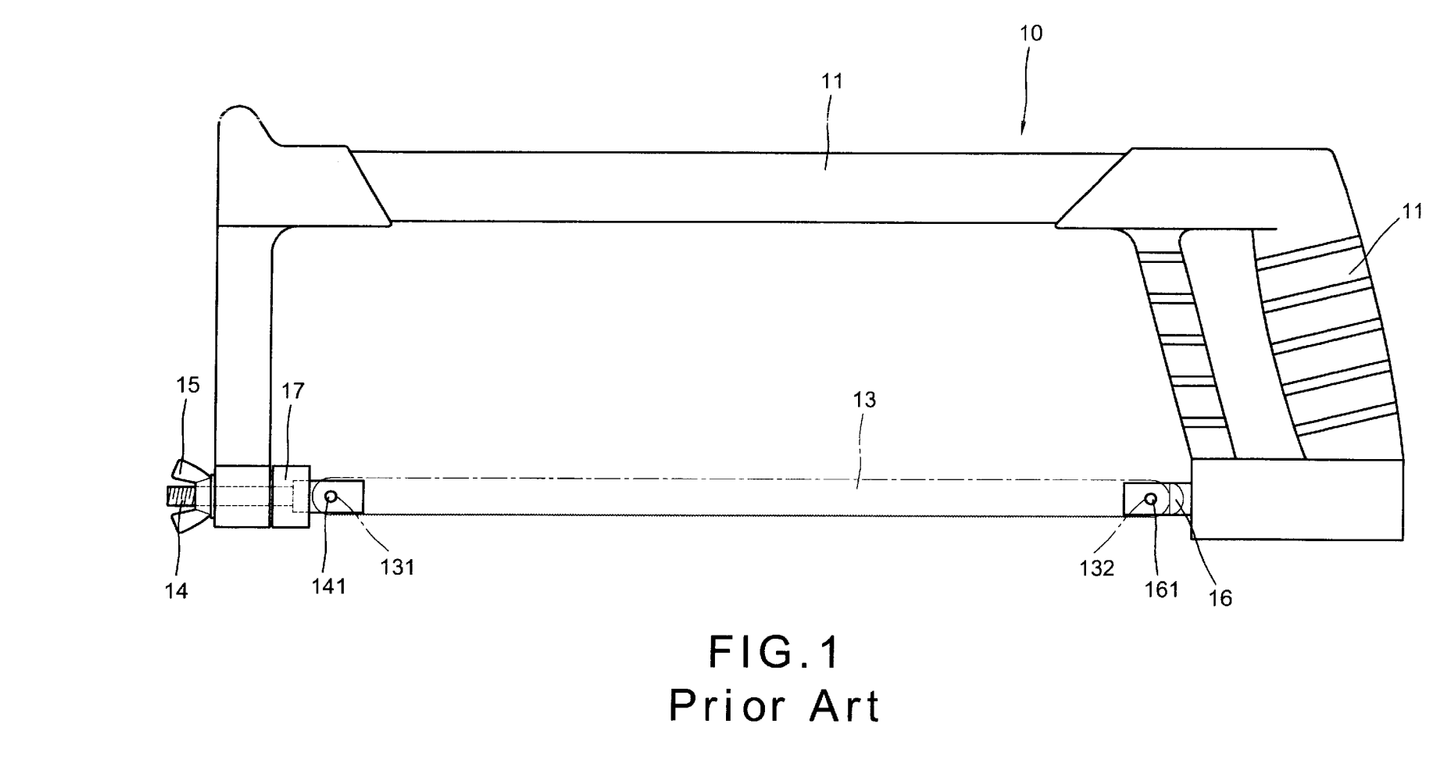
FIG. 1 is a plane view to show a hacksaw according to a prior art.
Figure 2:
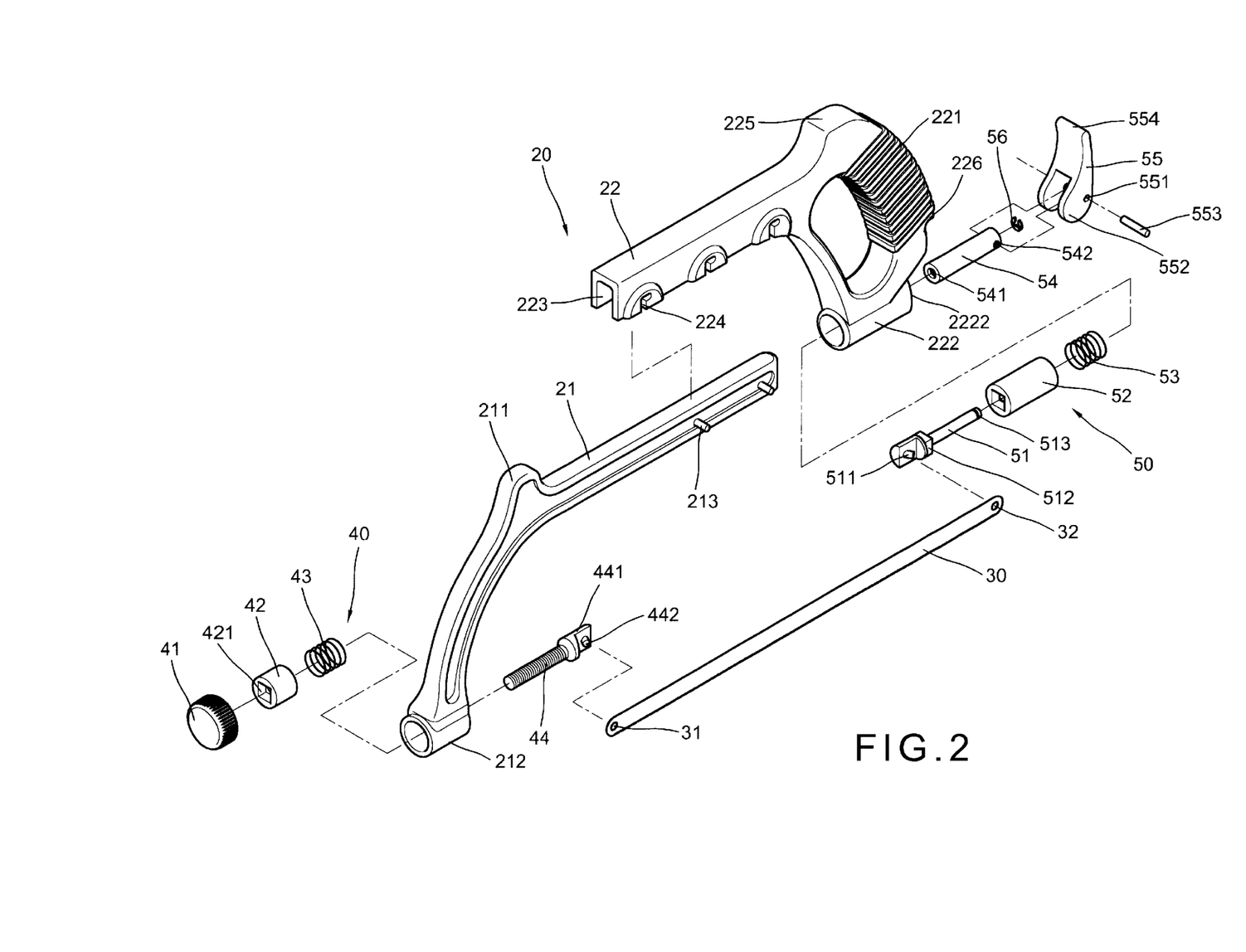
FIG. 2 is an exploded perspective view to show a hacksaw of the preferred embodiment according to the present invention.
Figure 3:
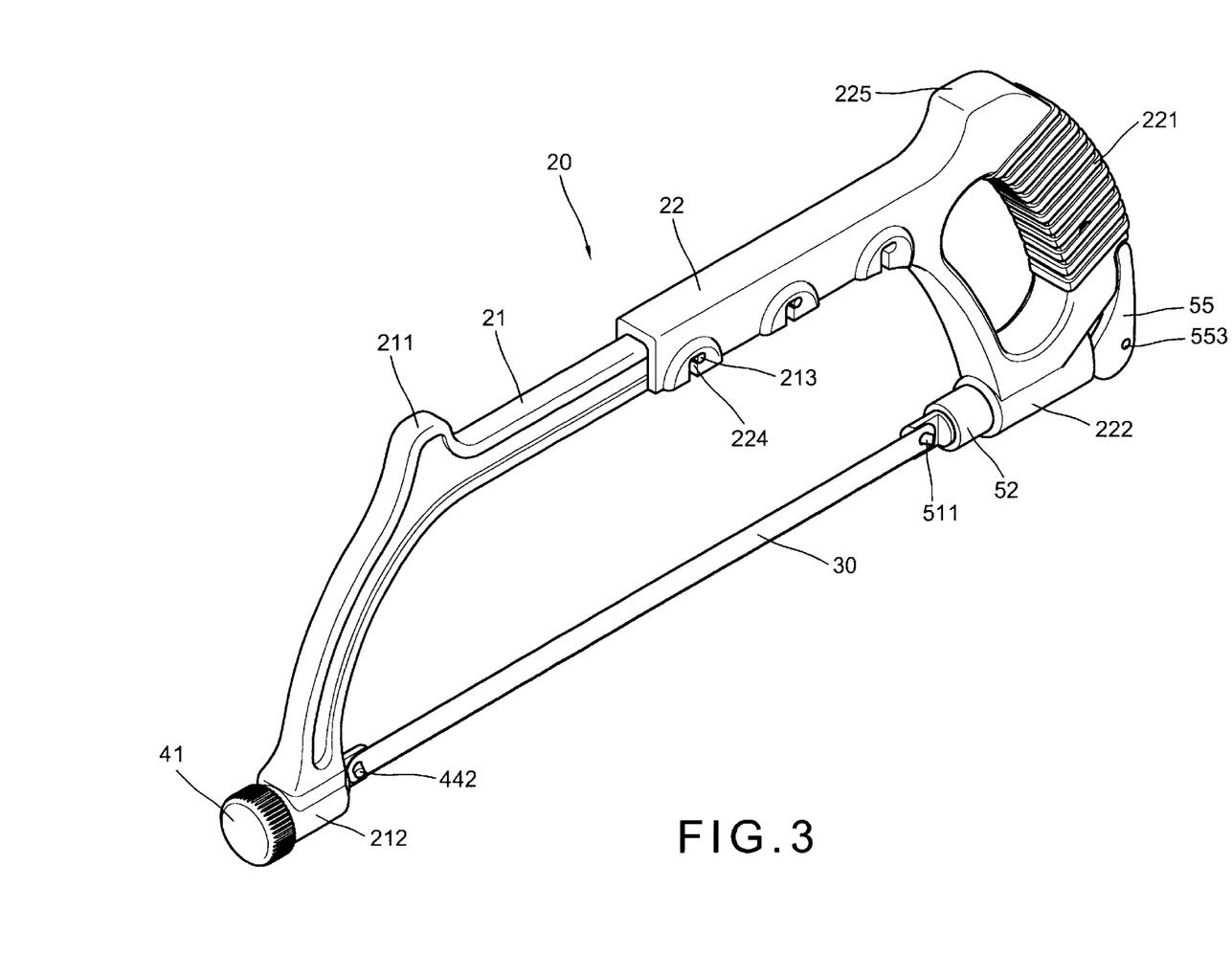
FIG. 3 is a perspective view to show the assembly of the hacksaw of FIG. 2.

Typical hacksaw 10 (as shown in FIG. 1) comprises a frame 11, a handle 12 on one end of the frame 11, a blade 13 having a thru hole 131 adjacent the front end engaged with a lateral pin 141 of a threaded shank 14, a wing nut 15 fastened a the outer end of the shank 14, a thru hole 132 adjacent the rear end of the blade 13 engaged with a lateral pin 161 of a projection 16. The blade 13 is tensed up or loosened up by rotation of the wing nut 15. The hacksaw 10 further has a graduated portion 17 on the shank 14 to facilitate the blade a certain angle relative to the frame 11. However, the wing nut 15 may be loosened under the shake of operation. Because the frame 11 is solid and not flexible, it could not serve for different lengths of the blade 13.

SUMMARY OF THE PRESENT INVENTION

The present invention has a main object to provide a structure of a hacksaw which is quickly assembled or disassembled without loosening up.

Another object of the present invention is to provide a structure of a hacksaw in which the frame is lengthily adjustable to suite different lengths of the blade.

Still another object of the present invention is to provide a structure of a hacksaw in which the blade can be adjusted to exact angle.

Further object of the present invention is to provide a structure of a hacksaw which can be operated by two hands to increase its working capability.

The present invention will become more fully understood by reference to the following detailed description thereof when read in conjunction with the attached drawings.

DETAILED DESCRIPTION OF THE PREFERRED EMBODIMENT

With reference to FIG. 1 to 5 of the drawings, the structure of a hacksaw of the present invention comprises generally a frame 20, a blade 30, an adjustable mechanism 40 and a positioning mechanism 50.

Figure 4:
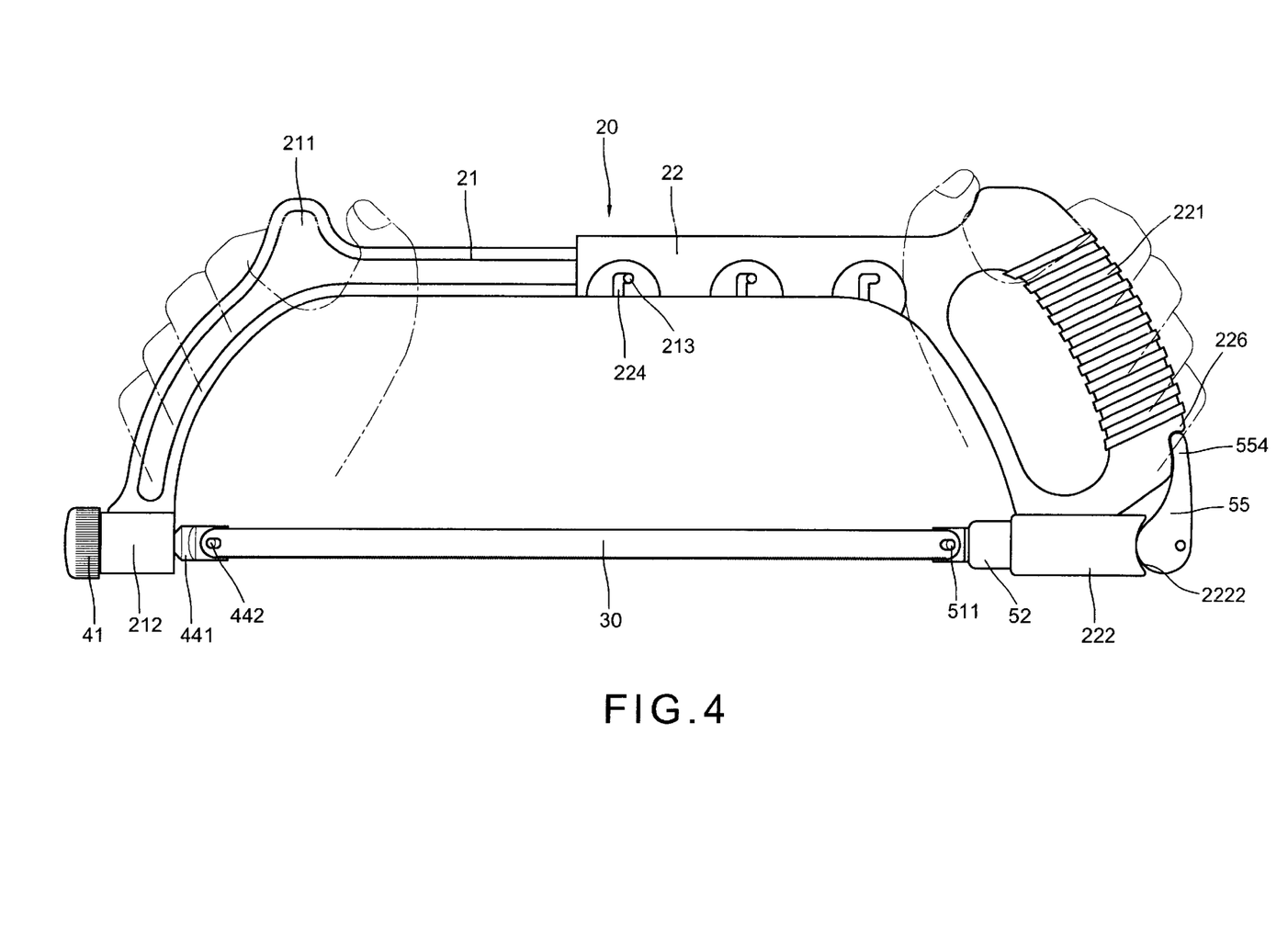
FIG. 4 is a plane view of FIG. 3.

The frame 20 is combined with a fore frame 21 and rear frame 22. The fore frame 21 has a projection 211 projected upward from an arcuate portion, a tube 212 connected with a lower end including an inward flange 2121 at rear end connected to a small pipe in the center of the tube 212 and a plurality of connection rods 213 spacedly projected outward from two lateral sides adjacent the upper end. The rear frame 22 has a pistol-grip handle 221 on rear end, a tube 222 connected to the under side of the handle 221 including an inward flange 2221 at an inwardly arcuated rear end 2222, an inverse U-shaped groove 223 in the body of the rear frame 22, a plurality of inverse L-shaped grooves in two lateral side of the body engageable with the connection rods 213 of the fore frame 21, a projection 225 on the top of the handle 221 facing to the projection 211 of the fore frame 21 at a distance which are provided to facilitate the thumbs of two hands to operate the hacksaw (as shown in FIG. 4), and an indentation 226 under the handle 221 including a protrudent member 2261 at outer side.

The blade 30 has two eyes 31 and 32 adjacent two ends.

Figure 5:
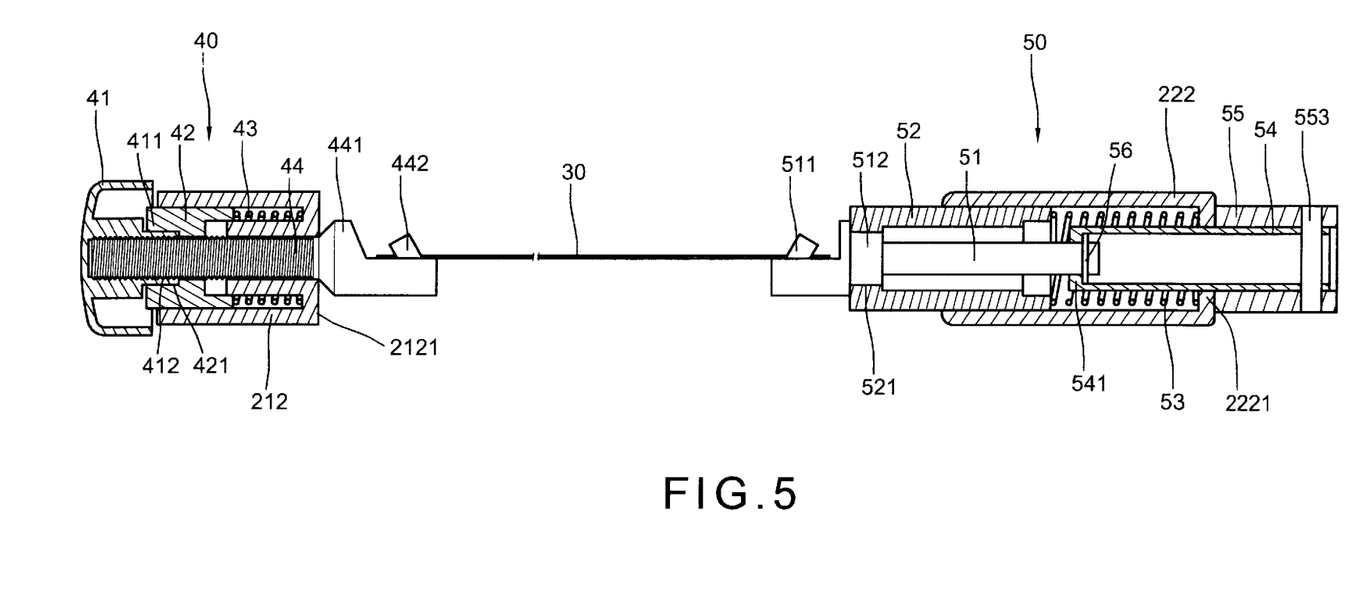
FIG. 5 is a sectional view to show the lower part of the hacksaw of the present invention.

The adjustable mechanism 40 has a graduated cap 41 including an internally threaded 412 rectangular block 411 centrally extended outward from the inner surface of the bottom thereof (as shown in FIG. 5), a hollow bore cylinder stopper 42 including a rectangular cavity 421 and a central bore disposed between the cap 41 and the small pipe of the tube 212 biased by a spring 43 with the rectangular cavity 421 engaged with the rectangular block 411 of the cap 41 and a threaded shank 44 inserted into the small tube of the tube 212 and the central bore of the hollow cylinder stopper 42 and then fastened to the internal threads 412 of the cap 41. The shank 44 has a rectangular head 441 and a bevel pin 442 on one lateral side of the rectangular head 441 for engaging with an eye 31 of the blade 30. The spring 43 which is wrapped on the small pipe has one end reached to the inner surface of the inward flange 2121 and the other end stopped against the peripheral wall of the hollow cylinder stopper 42 which is rotated simultaneously with the cap 41.

The positioning mechanism 50 has a shank 51 including a bevel pin 511 on a lateral side of a rectangular head 512 of the shank 51 for engaging the other eye 32 of the blade 30 and an annular groove 513 adjacent an inner end thereof, a hollow cylinder 52 axially disposed into the fore end of the tube 222 of the rear frame 22 having a rectangular cavity 521 in fore end engaged with the rectangular head 512 of the shank 51 which is inserted into the hollow cylinder 52, a spring 53 biased between the hollow cylinder 52 and the inner surface of the inward flange 2221 of the tube 222, a tubular rod 54 having a reduced central bore 541 in fore end engaged within the free end of the shank 51 secured by an elastic C-shaped ring. 56 in the annular groove 513 so that the shank 51 is captured in the tubular rod 54 and an aligned thru hole 542 in a periphery adjacent the rear end thereof. The tubular rod 54 inserted into the rear end of the tube 222 through the spring 53 to give the shank a certain elastic tension. A wedge lever 55 having a eccentric aligned thru hole 551 engaged with the aligned thru hole 542 of the tubular rod 54 and rotatably secured by a pin 552, a round outer edge 552 on lower end engageable with the inwardly arcuated end 2222 of the tube 222 and a thumbpiece 554 engageable into the indentation 226 and hold by the protrudent member 2261 of the handle 221 (as shown in FIG. 6) in order to prevent any inadvertent touch to the thumbpiece 554.

Figure 6:
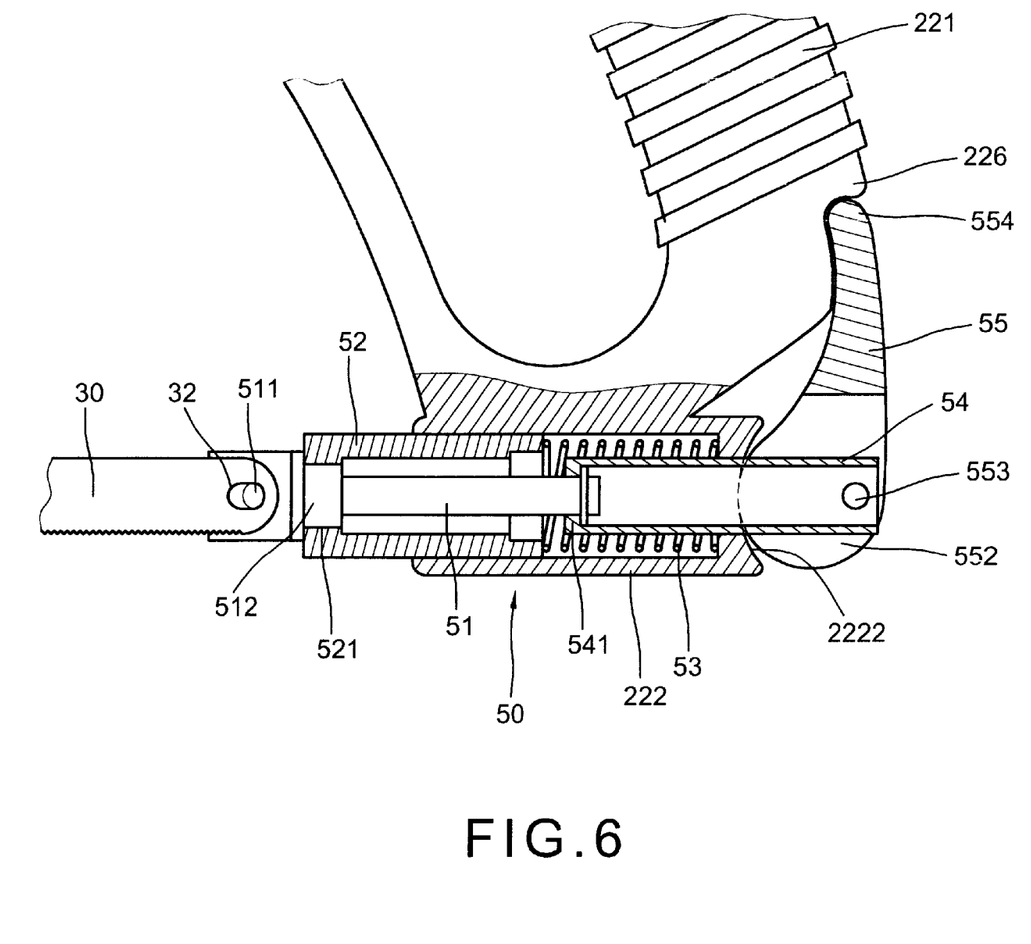
FIG. 6 is a sectional view a positioning mechanism of the hacksaw of the present invention.
Figure 7:
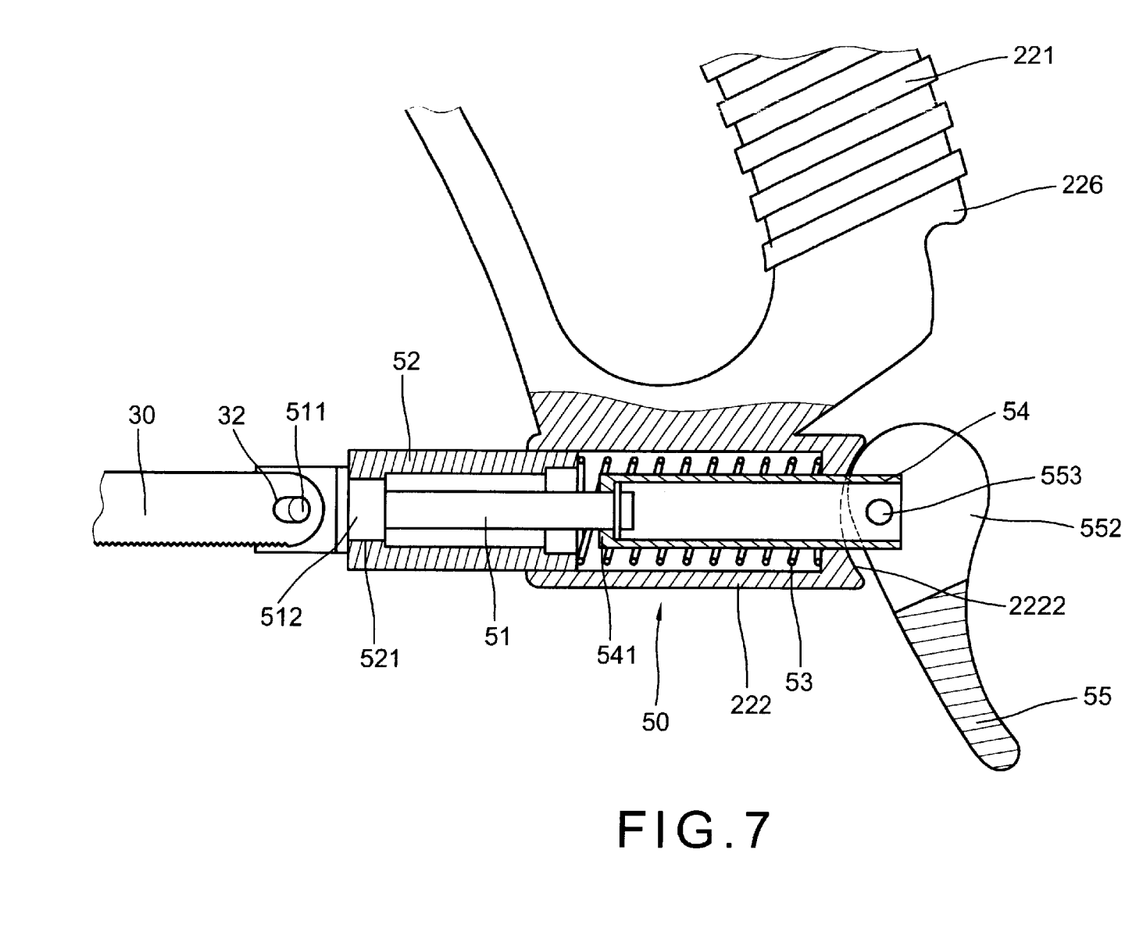
FIG. 7 is a sectional view to show that a wedge lever is put down to loosen to blade.
Figure 8:
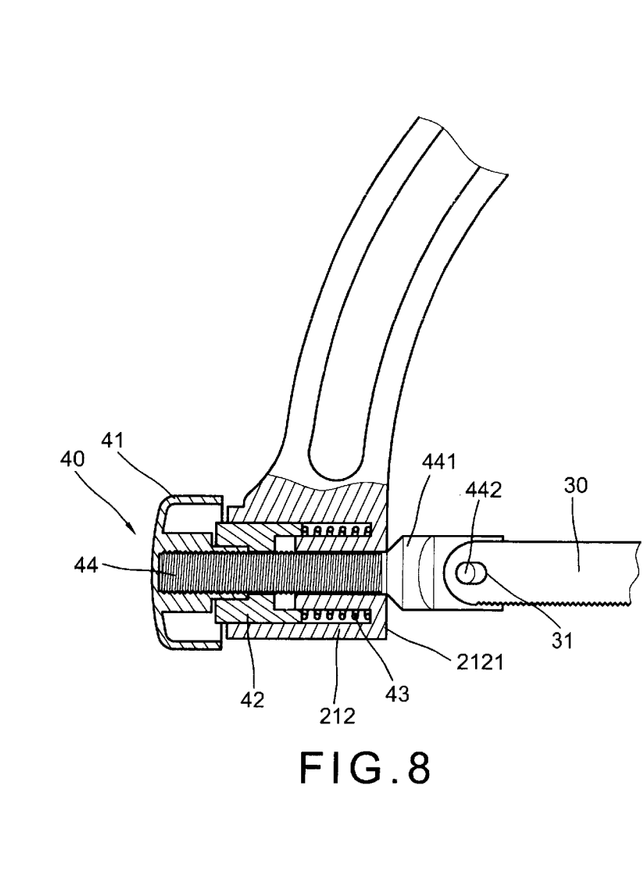
FIG. 8 is a sectional view to show an adjustable mechanism of the present invention.
Figure 9:
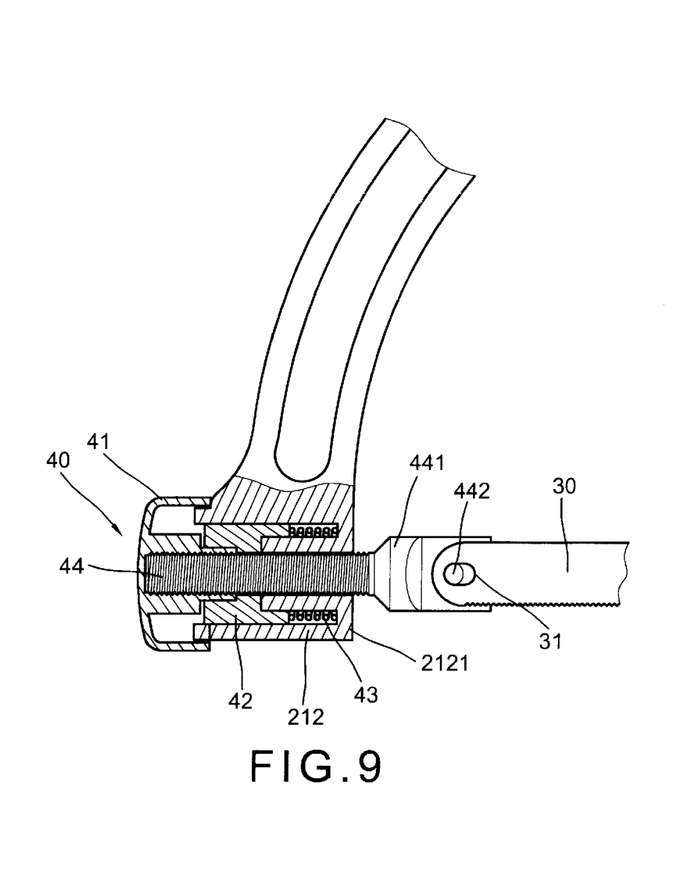
FIG. 9 is a sectional view to show that the adjustable mechanism is loosening.

Referring to FIG. 6 to 9 of the drawing, when disassembles the blade 30, presses the graduated cap 41 inward (as shown in FIG. 8 and 9) and rotates the wedge lever downward (as shown in FIG. 7) to shorten the eccentric distance so that both the tubular rod 54 and the shank 51 are moving forward. The blade 30 is loose to be removed to change a new one. When assembles a new blade 30, respectively engages the eyes 31 and 32 onto the bevel pins 442 and 511 and rotates the wedge lever upward (as shown in FIG. 6) to have the eccentric distance elongated. Then the shank 51 and the tubular rod 54 are forced to move rearward to tense the blade 30 without loosening. Both the springs 43 and 53 provide appropriate tension force to the blade 30. If adjusting the tilt angle of the blade 30, turns the wedge lever 55 downward (as shown in FIG. 7) and rotates the graduated cap 41, both the shanks 44 and 51 become rotatable so as to find a certain degree of the tilt angle for the blade 30 relative to the frame 20.

Figure 10:
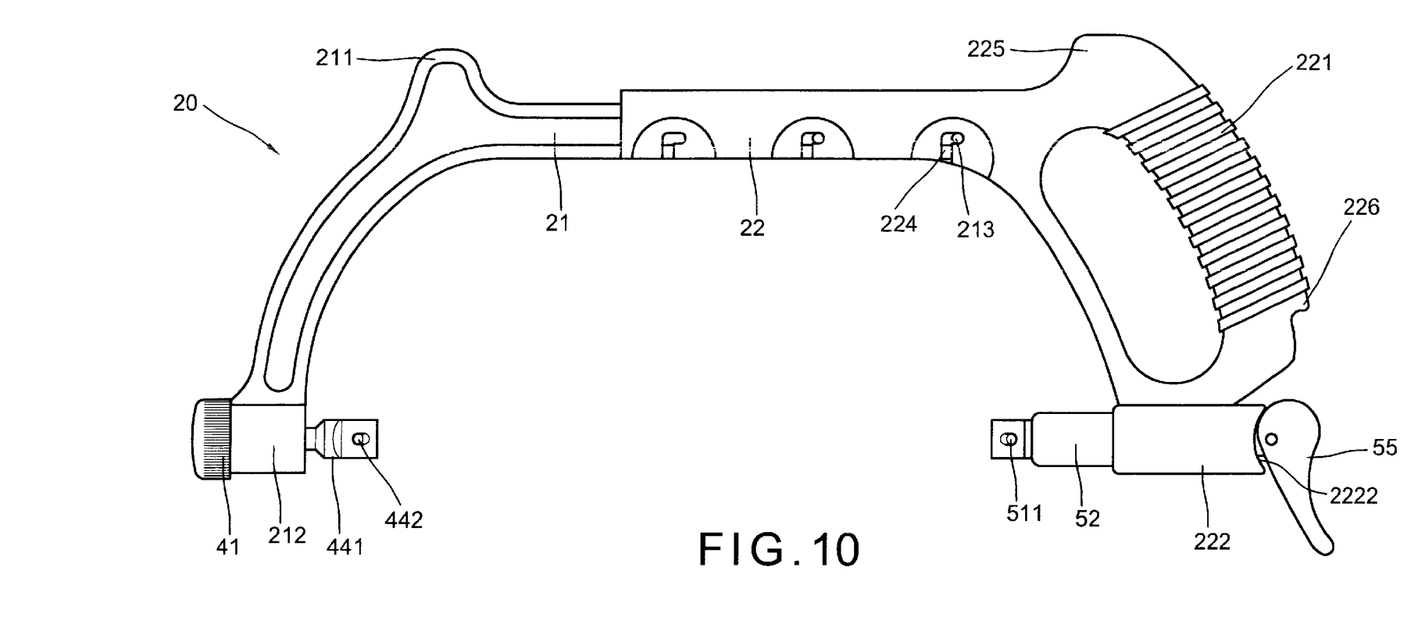
FIG. 10 is a side elevational view to show the assembly of the frame of the present invention.
Figure 11:
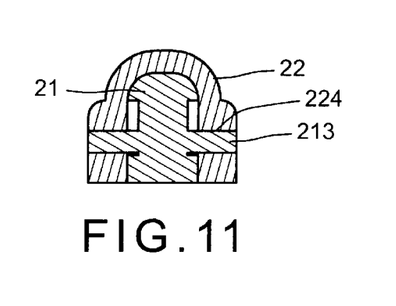
FIG. 11 is a sectional view to show that the lateral rods of the fore frame engage with the inverse L-shaped grooves of the rear frame.

Referring to FIG. 10 and 11 and FIG. 2 again, if fries to change the length of the frame 20 in order to suit to different lengths of the blades 30 that is to change the position of the lateral rods 213 of the fore fame 21 to the suitable inverse L-shaped grooves of the rear frame 22. This process is very simple and rapid.

The specification relating to the above embodiment should be construed as exemplary rather than as limitative of the present invention, with many variations and modifications being readily attainable by a person of average skill in the art without departing from the spirit or scope thereof as defined by the appended claims and their legal equivalents.

I claim:

1. A structure of a hacksaw comprising:

a frame combined by fore part and a rear part;

said fore part having a first projection projected upward from an arcuate portion thereof, a first tube connected with a lower end of the fore part including an first inward flange at rear end connected to a small pipe in center of the first tube and a plurality of connection rods spacedly projected outward from each lateral side adjacent upper end of the fore part;

said rear part having a pistol-grip handle on rear end, a second tube connected to an under side of the handle including a second inward flange at an inwardly arcuate rear end, an inverse U-shaped groove in a body of the rear part, a plurality of inverse-L-shaped grooves in each lateral side of the body engageable with the connection rods of the fore part respectively, a second-projection on a top of the handle, an indentation under the handle and a protrudent member on an outer side of the indentation;

a blade having a first eye adjacent a first end and a second eye adjacent second end;

an adjustable mechanism disposed into the first tube of the fore port having a graduated cap including a rectangular block centrally projected inward from the inner surface of the bottom thereof and an inner thread inside the block, a hollow cylinder stopper having a first rectangular cavity in fore end engaged with the rectangular block of the cap and a central bore, a first spring biased between rear end of the stopper and the inner surface of the first inward flange and a threaded shank inserted through the flange and the stopper and then fastened to the inner thread of the rectangular block of the cap and having a rectangular head and a first bevel pin on a lateral side engaged into the first eye of the blade;

a positioning mechanism having a shank including a rectangular head, a second bevel pin on a lateral side engaged within the second eye of the blade and an annular groove adjacent an inner end thereof, a hollow cylinder disposed into fore end of the second tube of the rear frame having a second rectangular cavity engaged with rectangular head of the shank inserted through the hollow cylinder and capture by a C-shaped retaining ring inside a tubular rod which has a third inward flange on rear end to stop the C'-shaped retaining ring by inner surface of the flange and an aligned thru hole in a periphery adjacent rear end, a second spring wrapped on the tubular rod and biased between the hollow cylinder and inner surface of the second inward flange, and a wedge lever having a eccentric aligned in a lower portion engaged with the aligned thru hole of the tubular rod, a round bottom engageable with the inward arcuate end of the second tube and a thumbpiece on top engageable into the indentation and stopped by the protrudent member of the handle.

2. The structure as recited in claim 1 wherein said frame is adjustable to serve different lengths of the blade.

3. The structure as recited in claim 1 wherein said blade is adjustable to change the tilt angle.

* * * * *